United States Patent [19]

Klebenow et al.

[11] Patent Number: 5,002,840
[45] Date of Patent: Mar. 26, 1991

[54] SWITCHED EMERGENCY BATTERY SYSTEM

[75] Inventors: Alan J. Klebenow, Brookfield; Thomas J. Dougherty, Waukesha; Edward N. Mrotek, Grafton; David A. Thuerk, Brookfield; Maurice G. Michaud, Mequon, all of Wis.

[73] Assignee: Globe-Union Inc., Milwaukee, Wis.

[21] Appl. No.: 365,084

[22] Filed: Jun. 12, 1989

[51] Int. Cl.$^5$ .............................................. H01M 10/12
[52] U.S. Cl. ........................................ 429/9; 429/123; 429/150
[58] Field of Search .................. 429/150, 50, 121–123, 429/97, 9, 149; 307/10.6; 320/6, 29, 63; 290/50

[56] References Cited

U.S. PATENT DOCUMENTS

| | | | |
|---|---|---|---|
| 2,044,917 | 6/1936 | Richardson | 320/6 X |
| 3,200,014 | 8/1965 | Roberts | 429/9 |
| 3,758,345 | 9/1973 | Toth | 429/9 |
| 4,883,728 | 11/1989 | Witehira | 429/160 |

OTHER PUBLICATIONS

Three Page Brochure of Pacific Dunlop of Australia Showing the Exide Switch Battery.
Ten Page Dealer Service Bulletin No. 85-POL-1 dated Oct. 25, 1985, Regarding the Delco Power Reserve Freedom Battery System.

*Primary Examiner*—Anthony Skapars
*Attorney, Agent, or Firm*—Foley & Lardner

[57] ABSTRACT

The invention provides a vehicle battery system including a main and a reserve battery disposed within a battery housing (10) having conventional external dimensions and battery terminal locations. An illustrated embodiment includes a main battery, comprising a series of thin, flat cells (38) disposed along a first axis, and a reserve battery, comprising a series of cells (42) diposed along a second axis transverse to the first axis. An electrical circuit facilitates selective communication between the reserve battery and the vehicle starter in accordance with the position of a switch assembly (100). The circuit illustratively includes a diode (110) configured to permit current flow into the reserve battery (104) during recharging, but which prevents reserve battery drain during normal vehicle operation. A variable resistor (112) is disposed in series with the diode to limit the amount of power, and hence the amount of heat, dissipated by the diode. When the main battery becomes drained, switch assembly (100) is actuated to bring the reserve battery (104) into parallel with the main battery (102).

28 Claims, 8 Drawing Sheets

SWITCHED EMERGENCY BATTERY SYSTEM

BACKGROUND OF THE INVENTION

1. Technical Field

The present invention relates, generally, to rechargeable battery systems including a main and a reserve battery disposed for intermittant electrical communication, and more particularly to vehicle battery systems wherein both batteries are configured within a housing having conventional external dimensions.

2. Background Art and Technical Problems

Vehicle battery systems having a main and a reserve unit, separated by a one-way diode for maintaining the reserve unit in the charged condition during non-use, are generally known. The diode allows current to flow from the vehicle generator into the reserve battery, but prevents the reserve battery from discharging through the current path including the diode. Diodes are problematic, however, in that they exhibit a limited current carrying capacity. Diodes having a relatively low current carrying capacity may be blown if excessive current is driven therethrough, whereas diodes having higher current ratings typically dissipate correspondingly large amounts of thermal energy. For example, commercially available diodes typically exhibit a voltage drop of approximately 0.7 volts thereacross. Thus, a diode having 25 amps running therethrough radiates approximately 17.5 watts. Consequently, various design parameters associated with the diode environment, for example, proximity to plastics and volatile chemicals, availability of heat sinks, diode size, and production costs are circumscribed by the heat-generating character of diodes.

In the context of the dual battery of the present invention, the terms "reserve unit" and "reserve battery" refer to a low cycle auxiliary battery configured for intermittent use, as distinguished from "reserve capacity," a term of art referring to the length of time a battery is capable of delivering, for example, twenty-five (25) amperes under given conditions. Furthermore, it will be understood that the word "termination" as used herein describes an electrical contact associated with a battery element, typically an element located at an end of a battery (the terminal element). Each terminal element may have one or more terminations associated therewith for carrying current to or from the battery. Each individual battery generally has a positive termination associated with one end thereof and a negative termination associated with the opposite end. Terminations which extend through the battery housing for attachment to a load are referred to as terminals, and may be cylindrical, frustroconical, flanged, L-shaped, or D-shaped, for example. Terminations which do not extend through the housing or which do not communicate directly with a load are typically configured for electrical communication with an adjacent battery, and are referred to as "flush terminations".

Prior art dual battery systems have proven unreliable and cumbersome. A switchable dual battery, for example, one disclosed by Pacific Dunlop of Australia, comprises a series of thin, flat, parallel electrode plates. A first portion of the plates comprises the main battery and a second, adjacent portion parallel to the first portion comprises the reserve battery. The two batteries are linked by a switch mechanism for controlling the discharge of the reserve unit. Each battery purportedly delivers 12 volts, the main battery being rated at 370 CCA (cold crank amps) and the reserve battery at 115 CCA. The two batteries are electrically configured in parallel, with a one-way diode disposed therebetween to prevent the reserve unit from discharging during periods of non-use. A manually operable switch is interposed between the two batteries, in parallel with the diode, to bypass the diode when it is desirable to discharge the reserve unit. If the switch is inadvertently left in bypass (shunt) mode, however, the reserve unit will discharge along with the main unit, thereby impairing the ability of the reserve unit to function as an auxiliary starting battery. When the switch is open, on the other hand, the diode may be blown if excessive current is drawn therethrough during charging of the reserve battery.

A Power Reserve Battery system, bearing the name DELCO POSIPOWER, has been observed in certain 1985 model automobiles. The battery housing has three external terminals extending from the cover: a main battery positive terminal; a reserve (starter) battery positive terminal; and a common negative (ground) terminal.

The negative terminal electrodes of each battery in the DELCO POSIPOWER system are purportedly connected through a link in the battery housing cover assembly. Thus, a vehicle electrical system requires three cables to accomodate the POSIPOWER system. The cable from the positive terminal of the reserve battery is connected to a solenoid which is activated during starting; the solenoid and starting circuit are located in a control box remote from the battery housing. Each time the ignition key is turned to the "start" position, the main battery latches the solenoid to bring the reserve battery into parallel with the main battery. When the cranking cycle is complete, the solenoid unlatches, again isolating the reserve battery. In the event the main battery lacks sufficient power to energize the latching solenoid, a bypass system, located in the control box, may be manually activated to establish communication between the reserve battery and the starting circuit.

The performance of these prior art battery systems has been unsatisfactory. In particular, retrofitting vehicles to accommodate different sized battery housings, different terminal configurations, or remote circuitry is often cost prohibitive. System reliability may be impaired if diodes with insufficient current-carrying capacity are employed (the diode may be destroyed), whereas safety and performance are compromised when high current capacity diodes are used because of the excessive heat generated thereby. Moreover, presently known dual battery configurations do not permit disposition of two batteries, each capable of delivering sufficient power to start a vehicle, within a housing defined by a conventional vehicle battery envelope and having terminal locations designed to accommodate conventional vehicle cable configurations.

SUMMARY OF THE INVENTION

A preferred embodiment of the switched emergency battery system of the present invention provides a main battery in selective electrical communication with a reserve battery, the system being disposed within a housing characterized by conventional external dimensions and wherein the terminals are disposed to accommodate conventional vehicle cable configurations. Efficient utilization of the available space within a conventional battery housing envelope (i.e., conventional external dimensions) allows the main battery to exceed SAE recommended minimum CCA output ratings for most original equipment manufacturer (OEM) vehicles, for example, a thirty (30) second start cycle at 0° C., while allowing the reserve unit to provide sufficient CCA output for a plurality of start cycles each in the range of approximately ten (10) seconds. The use of a conventional battery housing envelope facilitates relatively low cost production through the utilization of existing manufacturing equipment and processes.

In accordance with one aspect of a particularly preferred embodiment, the individual cells of the main battery are disposed perpendicular to the longitudinal axis of the battery housing. The cells of the reserve battery are disposed at one end of and perpendicular to the main battery, so that the positive terminal of the main battery and negative terminal of the reserve battery are disposed along a common lengthwise edge of the housing cover. This configuration renders the subject battery system interchangeable with conventional two-terminal automotive batteries. A highly conductive bus bar, embedded within the housing cover, connects the negative terminations of both batteries together. A pair of bus bars, one connected to the main battery positive terminal and the other to the reserve battery positive terminal, are also embedded in the cover and terminate at a switch mechanism.

In accordance with another aspect of the invention, the switching mechanism is also disposed within the cover and includes a manually operable actuator for selectively establishing communication between the main and reserve batteries. A one-way diode, in parallel with the switch, prevents the reserve battery from discharging when the switch is open, but allows current to pass through the diode to maintain the reserve battery in the charged state. A variable resistance, positive temperature coefficient (PTC) resistor is disposed in series with the diode to limit the amount of current flowing therethrough, and, hence, the amount of heat generated by the diode.

According to a further aspect of the invention, the switched emergency battery system is configured for disposition within a vehicle for electrical communication with conventional vehicle battery cables. In the event the main battery output is too low to start the vehicle, the operator manipulates the switch to the closed position, thereby bringing the reserve battery, which is maintained in the fully charged state by the diode/variable resistor circuit, into parallel with the main battery. Upon starting the vehicle, the operator manipulates the switch back to the open position, thereby preventing further drain from the reserve battery. The main battery will be recharged in the conventional manner during vehicle operation; the reserve battery will be recharged, albeit at a slower rate, through the diode/variable resistor circuit.

BRIEF DESCRIPTION OF THE DRAWING

Preferred exemplary embodiments of the present invention will hereinafter be described in conjunction with the appended drawing, wherein like numerals denote like elements, and.

DETAILED DESCRIPTION OF PREFERRED EXEMPLARY EMBODIMENTS

Figure 1:
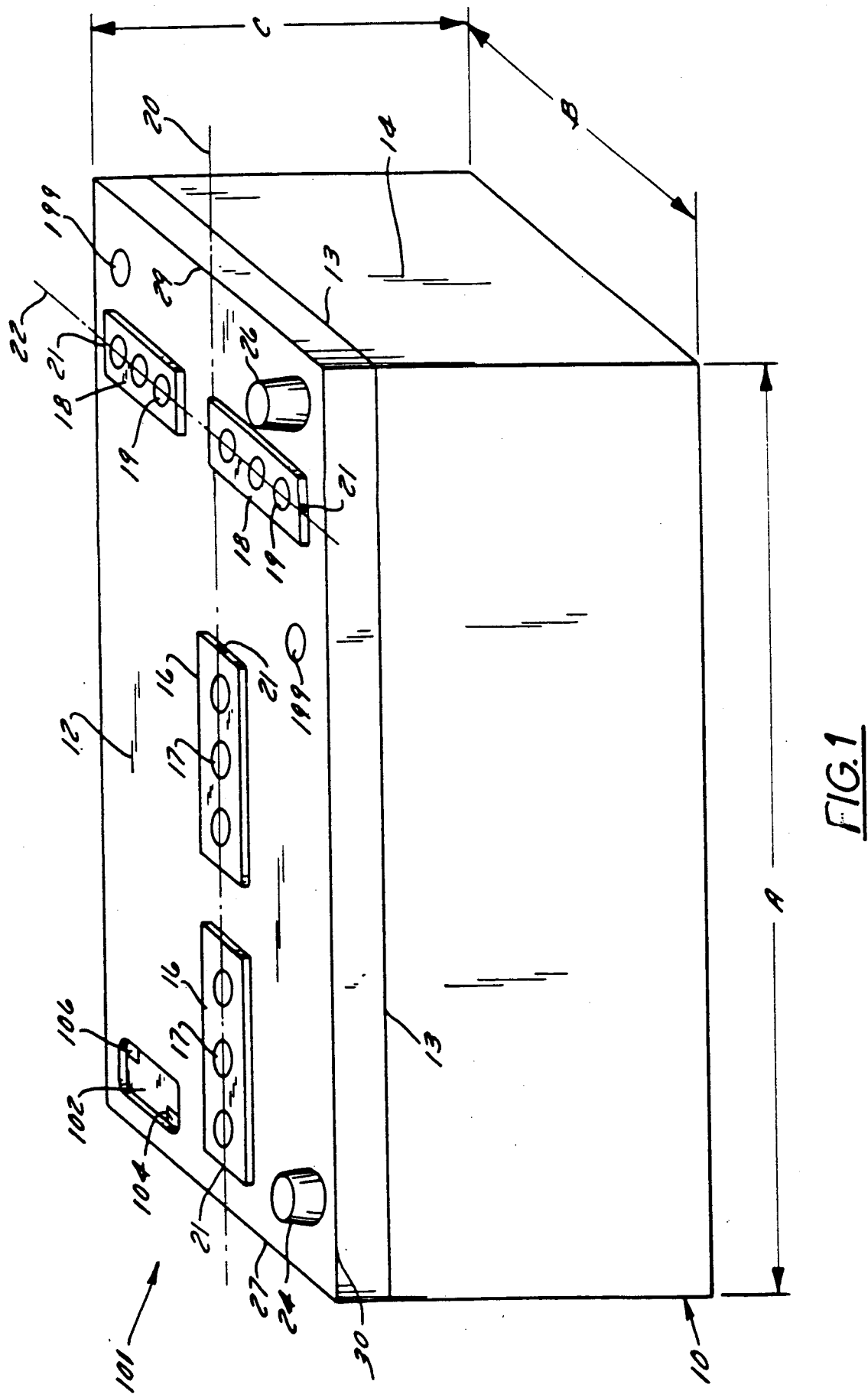
FIG. 1 is perspective view of an exemplary embodiment of a battery system in accordance with the present invention, shown in the fully assembled condition with the switching mechanism removed.

In a particularly preferred embodiment of the switched emergency battery system in accordance with the present invention, the main and reserve units each comprise a lead-acid battery. A lead-acid battery comprises of a number of cells disposed in a container. A series alternating positive and negative electrodes (plates), having separators sandwiched therebetween, are disposed in each cell.

In a preferred embodiment, two separate electrode reactions combine to become the cell reaction, given by:

positive electrode (plate):

$$PbO_2 + 4H^+ + SO_4^{--} + 2e \rightleftharpoons 2H_2O + PbSO_4$$

negative electrode (plate):

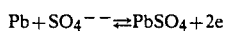

$$Pb + SO_4^{--} \rightleftharpoons PbSO_4 + 2e$$

The positive plate suitably comprises lead oxide (the electroactive material) disposed on a lead alloy grid. The negative plate suitably comprises lead as the electroactive material on a lead alloy grid.

Lead alloys employing, for example, antimony may be used as grids for positive plates; lead alloys employing, for example, calcium may be used for negative plates. Cell parameters, such as current acceptance, may vary according to alloy composition. For example, current acceptance may be increased by increasing the antimony content of the alloy. Such increased current acceptance can be advantageous where batteries are operated primarily in cold environments. On the other hand, current acceptance may be decreased by decreasing the antimony content. Decreased current acceptance of a battery may be most advantageous in warm environments.

Individual cells of both the main and reserve batteries may suitably comprise 1.4% lead-antimony alloy (i.e., 1.4% antimony) for the grid of the positive plates and 0.1% lead-calcium alloy (i.e., 0.1% calcium) for the grid of the negative plates. Impurities such as tin and aluminum may also be present. The main and reserve batteries may comprise dissimilar chemistries employing dissimilar lead alloys, as desired, depending on the specific operating conditions of the batteries and/or the vehicle in which they are used.

The electromotive potential of each cell in a particular battery is determined by the chemical composition of the electroactive substrates employed in the electrochemical reaction. For the lead acid chemistry described above, the voltaic potential is approximately two volts per cell, regardless of cell volume. With respect to automotive batteries, vehicles manufactured by original equipment manufacturers (OEM vehicles) typically require a twelve volt battery, which has evolved as the industry standard. Thus, each battery in accordance with the present invention advantageously comprises six cells (6 cells×2 volts/cell=12 volts).

In addition, OEM vehicles are configured for a battery having a conventional envelope, i.e., the external dimensions of a battery are appropriately compatible with the space ("envelope") provided for battery disposition within an OEM vehicle, as described herein. In the context of a dual battery, a threshold problem involves disposing two sets of six cells within a standard envelope such that for each cell, the number of plates per cell is minimized and the current carrying capacity is maximized. From a production standpoint, it is also advisable that the main and reserve batteries employ the same number of plates per cell.

As an initial proposition, the primary battery should have sufficient CCA output, for example 525 amps for a 30 second start cycle at 0° F., to accommodate most OEM vehicles in the class for which the battery is designed. The amount of current (CCA) produced by a two volt cell is a function of, inter alia, the combined surface area of all plates within the cell. Thus, the aggregate plate surface area per main battery cell may be determined once a design CCA is established for the main battery. To the extent that a battery generally may not be charged beyond the point at which the lowest current carrying cell (the limiting cell) is charged, it is also desirable for each cell to have approximately the same current capacity (plate surface area).

The number of plates per cell and the plate dimensions will depend on, inter alia, the size and relative disposition of the reserve battery with respect to the main battery. Once a design CCA is established for the reserve battery, the aggregate plate surface may be determined for each reserve battery cell.

An additional design consideration involves the environment within which the vehicle will be operated. For example, fewer and thicker plates may be used in warmer climates where a lower CCA output is required and susceptability to plate corrosion is greater than in cooler climates.

Having established the desired CCA output for the main and reserve batteries, and hence the aggregate plate surface area for each cell of each battery, it remains to determine the number of plates comprising each main cell and the number of plates comprising each reserve cell, and the relative dimensions (height, width, and thickness) of each "main" plate and each "reserve" plate. In selecting these dimensions, it is noted that the reserve battery is subject to relatively few cycles during its useful life and, thus, the relatively thick plates typically associated with high cycle main batteries are not necessarily appropriate in the reserve battery.

Total production costs can be reduced if the same number of plates are employed in the main and reserve battery cells. In this way, battery production may be streamlined by manufacturing an equal number of main and reserve plates. In addition, the total number of plates used in each cell should be minimized to reduce total cost. For example, each cell may contain in the range of about six (6) to fifteen (15) plates. In a highly preferred embodiment, eleven (11) plates, including for example, six (6) positive electrodes and five (5) negative electrodes, are employed in each cell of each battery.

The present inventors have further determined that, taking all the above factors into account, an optimum ratio of main to reserve CCA output may be achieved when the reserve battery is disposed orthogonal to the main battery, as described herein in connection with a highly preferred embodiment.

Alternatively, the main and reserve plates may be in parallel disposition, or in any other convenient relationship such the respective numbers of main and reserve plates per cell, in conjunction with the respective plate thicknesses, may be selected to yield the desired main and reserve CCA output.

Figure 2:
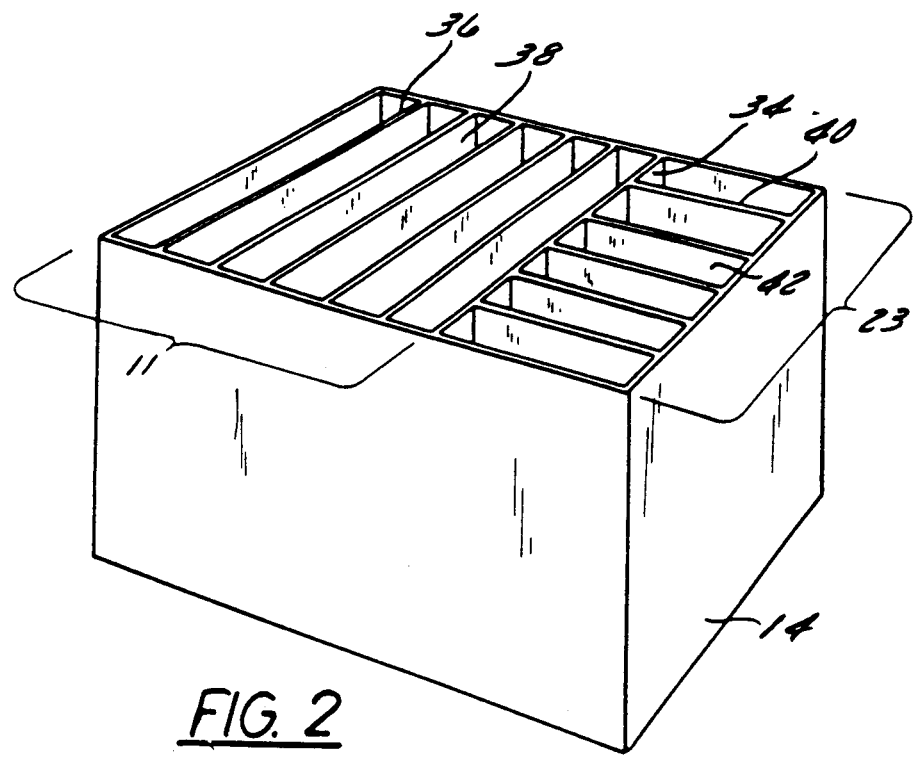
FIG. 2 is a perspective view of the container portion of the battery housing in accordance with the present invention.
Figure 3:
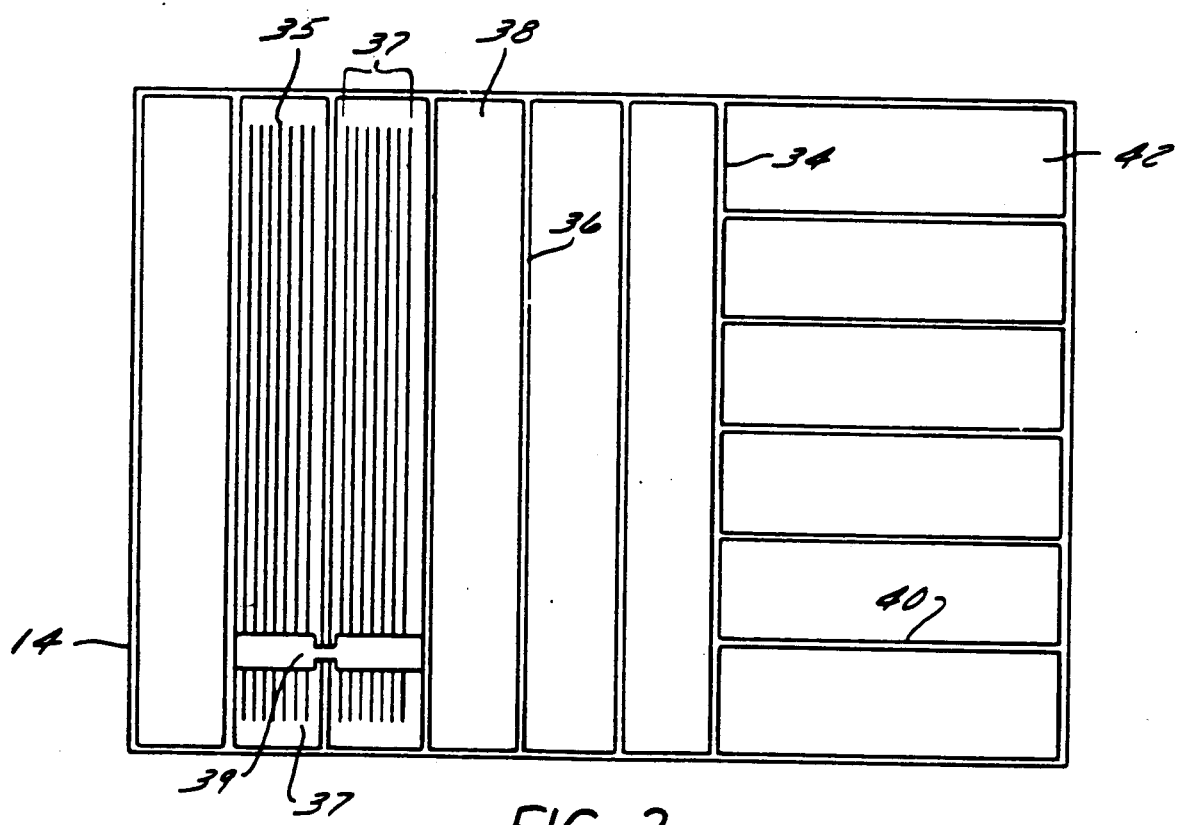
FIG. 3 is a top view of the container of FIG. 2 showing two exemplary elements hard wired together.

Referring now to FIGS. 1–3, the switched emergency battery system 101 in accordance with the present invention suitably comprises a housing 10 including a top portion (cover) 12 and a bottom portion (container) 14, joined together at line 13 during manufacture of the battery, for example by heat sealing in the vicinity of line 13. Container 14 comprises a wall 34 which divides the container into a main battery portion 11, including a plurality of main battery compartments (cells) 38, and a reserve battery portion 23, including a plurality of reserve battery cells 42.

In accordance with a highly preferred embodiment, the main battery is disposed along a main battery centerline (axis) 20 such that respective main battery plates 35 in each main battery cell are disposed parallel to each other and perpendicular to main centerline 20. Main battery centerline 20 is illustratively coincident with the axis of the battery housing, which axis is typically approximately parallel to a line joining the external battery terminals, discussed below.

The reserve battery is illustratively disposed at the right hand side of FIGS. 1–3. The individual cells of the reserve battery are disposed perpendicular to a reserve centerline 22, reserve centerline 22 being substantially perpendicular to main centerline 20. Perpendicular orientation of the main and reserve batteries reflects optimum space utilization within the envelope defined by battery housing 10.

Respective main battery vent caps 16, each comprising a plurality (e.g., three) of vent covers 17, are suitably disposed along main centerline 20, each vent cover 17 communicating with a corresponding main battery cell. Respective reserve battery vent caps 18, each comprising a plurality of vent covers 19, are suitably disposed along reserve centerline 22 in an analogous manner. Respective vent covers 16, 18 further comprise respective apertures 21 for venting the main and reserve batteries, respectively, to the external environment, as discussed in greater detail below in connection with FIG. 4.

Figure 9:
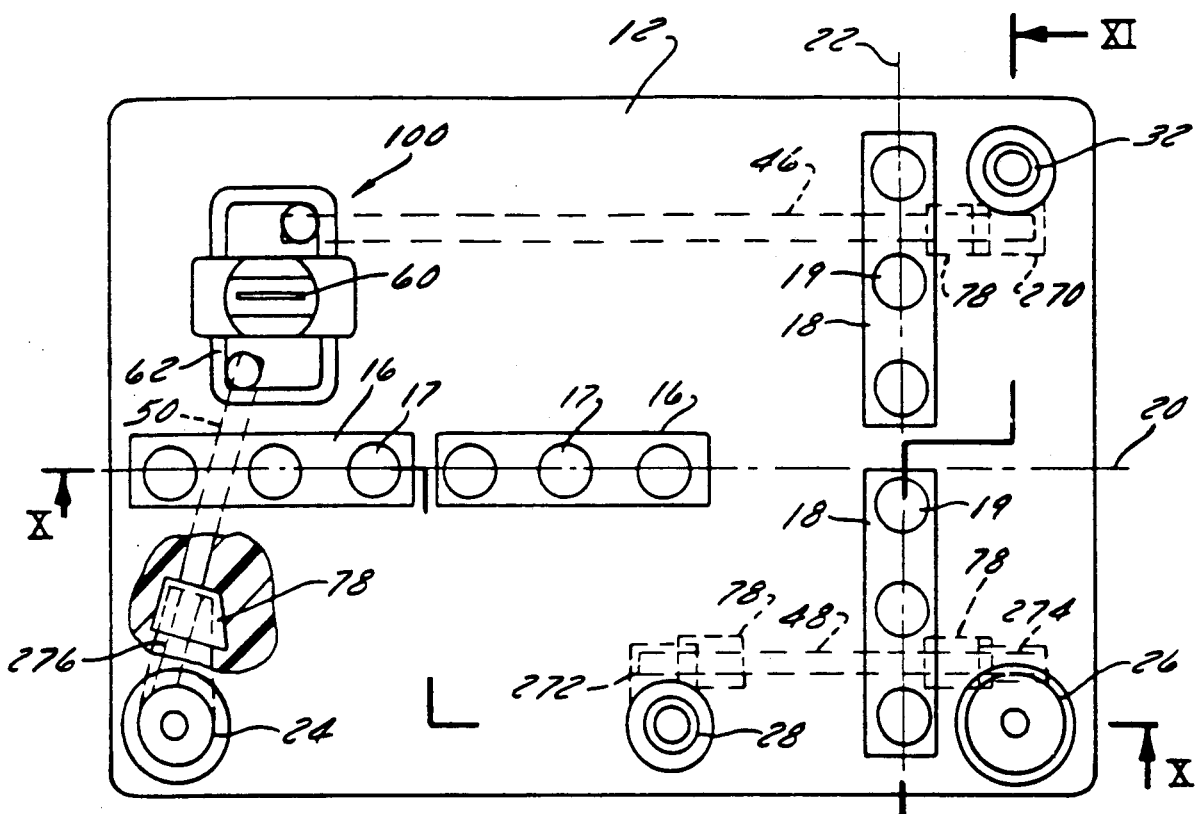
FIG. 9 is a top plan view of the battery housing cover shown in FIG. 1 with the switching mechanism installed.

In accordance with conventional battery terminal configurations, a positive main battery terminal 24 extends from the upper surface of cover 12, near a longitudinal edge 30 thereof, to facilitate attachment to the positive battery cable of a vehicle. Along the same longitudinal edge 30 of cover 12, a negative terminal 26 of the reserve battery extends upwardly through cover 12 for attachment to the negative battery cable of the vehicle (cables not shown). With reference to FIGS. 1 and 9, a negative battery termination 28 of the main battery is disposed along edge 30 of cover 12, but does not protrude therefrom. Similarly, a positive termination 32 of the reserve battery, disposed along an edge 29 of cover 12, does not protrude therefrom.

As discussed in greater detail below, a conductive bus bar 48 connects main battery negative termination 28 to reserve battery negative terminal 26. Thus, electrical communication may be established between both batteries and the vehicle electrical system through terminals 24 and 26, as desired. Respective burn caps 199 are sealed to cover 12 proximate terminations 28 and 32 after respective bus bars 48 and 46 are secured to the terminations, for example, by welding.

In accordance with one aspect of a preferred embodiment of the present invention, the dimensions, configuration, and terminal locations of battery housing 10 are similar (or identical) to those associated with conventional single battery housings, except that terminals 24 and 26 may be disposed immediately adjacent to edge 30. For example, the length (along centerline 20; dimension A in FIG. 1) of battery housing 10 is in the range of about 8 to 12 inches (20.3 to 30.8 cm), and preferably about 10 inches (25.4 cm), and most preferably about 10.3 inches (26.2 cm). The width of battery housing 10 (dimension B in FIG. 1) is preferably in the range of about 5 to 8 inches (12.7 to 20.3 cm), and more particularly in the range of about 7 inches (17.8 cm), and most preferably approximately 6.9 inches (17.5 cm). The height of battery housing 10 (perpendicular to respective centerlines 20 and 22; dimension C in FIG. 1) is in the range of about 5 to 9 inches (12.7 to 22.9 cm), and particularly about 7 inches (17.8 cm). In addition, the distance between the centers of terminals 26 and 28 is in the range of about 7 to 11 inches (17.8 to 27.9 cm), and particularly about 9 inches (22.9 cm), and most preferably approximately 8.9 inches (22.6 cm).

The distance between edge 30 and the centers of terminals 26 and 24 is in the range of about 0.2 to 5 inches (0.5 to 12.7 cm), and particularly about 0.5 to 1.5 inches (1.3 to 3.8 cm), and most preferably about 0.7 inches (1.8 cm). The distance between terminal 24 and the left edge of battery 10 (edge 27), and the distance between terminal 26 and the right edge of battery 10 (edge 29), is in the range of about 0.2 inches to 2 inches (0.5 to 5 cm), and particularly about 0.5 to 1.5 inches (1.3 to 3.8 cm), and most preferably approximately 0.8 inches (2 cm). The distance between the centers of terminals 24 and 26 and centerline 20 is preferably in the range of about 1.5 to 3.5 inches (3.8 to 8.9 cm), and preferably in the range of about 2.5 to 3 inches (6.4 to 7.6 cm), and most particularly approximately 2.7 inches (6.9 cm). Alternatively, terminals 24 and 26 may be centered on centerline 20, or the terminals may extend from a side of cover 12 or container 14, or both.

Figure 12A:
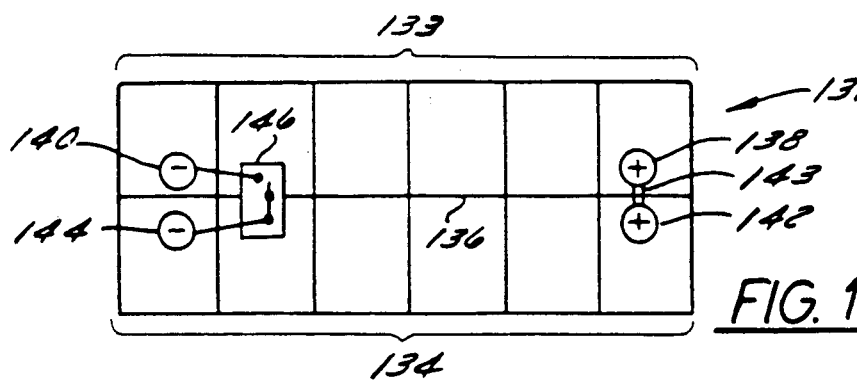
FIGS. 12A-E are top view schematic representations of alternative termination configurations in accordance with the present invention.

Referring now to FIGS. 12A-E, alternative terminal and termination configurations, as well as alternative battery orientations, may be employed in accordance with the present invention. With particular reference to FIG. 12A, a dual battery 131 suitably comprises a main battery 133, having a main battery positive terminal 138 and a main battery negative terminal 140, there being a wall 136 between main battery 133 and a reserve battery 134 including a reserve battery positive termination 142 and a reserve battery negative termination 144. A bus bar 143 connects main battery positive terminal 138 to reserve battery positive termination 142. A switch mechanism 146 is disposed for selectively establishing intermittent electrical communication between terminal 140 and termination 144, and hence between main battery 133 and reserve battery 134. Terminals 138 and 140 advantageously extend through the battery housing, for example from the top of battery 131, or, alternatively, from a side of or from respective ends of the battery.

Figure 12B:
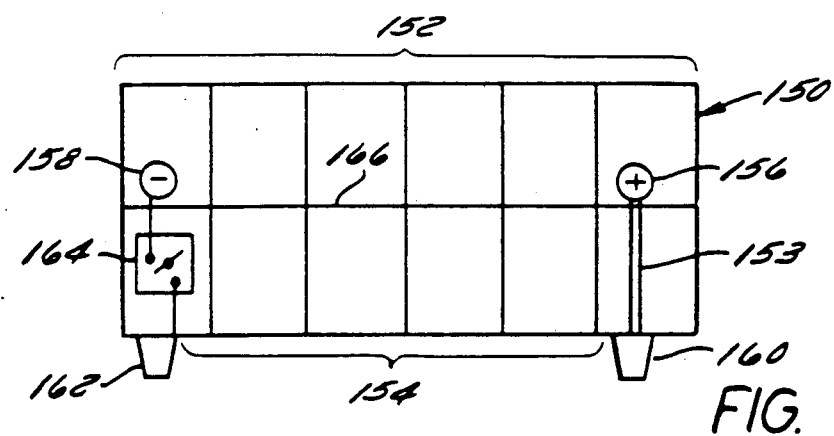

Referring now to FIG. 12B, a dual battery 150 suitably comprises a reserve battery 152, including reserve battery positive termination 156 and reserve battery negative termination 158, separated by a wall 166 from a main battery 154, including a main battery positive terminal 160 and a main battery negative terminal 162. A bus bar 153 connects main positive terminal 160 to reserve positive termination 156. A switching mechanism 164 is disposed to selectively establish electrical communication between reserve battery negative termination 158 and main battery negative terminal 162. Respective main battery terminals 160, 162 may extend from a side of battery 150, as shown in FIG. 12B, or, alternatively, may extend from the top of the battery or from respective ends of the battery, as desired.

Figure 12C:
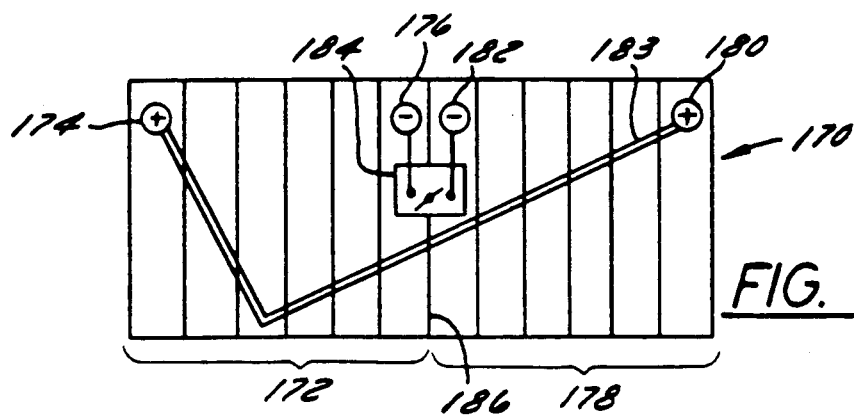

Referring now to FIG. 12C, a dual battery 170 suitably comprises a main battery 172, including main battery positive termination 174 and main battery negative termination 176, and a reserve battery 178, including reserve battery positive termination 180 and reserve battery negative termination 182. A wall 186 is advantageously disposed between the negative terminal electrode of main battery 172 and the negative terminal electrode of reserve battery 178. A bus bar 183 connects respective main and reserve positive terminations 174, 180. A switching mechanism 184 is configured to selectively establish electrical communication between respective negative terminations 176 and 182. In the configuration illustrated in FIG. 12C, main battery termination 174 functions as a terminal for attachment to a vehicle cable. Either main battery negative termination 176 or reserve battery negative termination 182 may function as the other terminal, as desired. Moreover, either or both terminals may extend from the top, side or ends of battery 170.

Figure 12D:
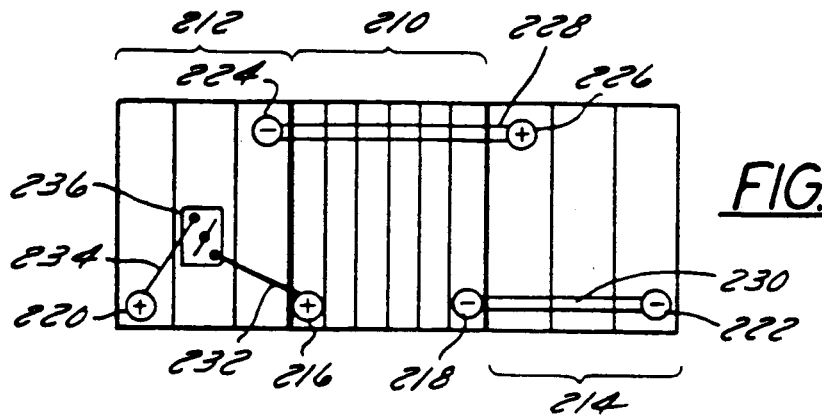

With reference to FIG. 12D, a reserve battery 210, having a positive termination 216 and a negative termination 218, is illustratively interposed between respective portions 212, 214 of a main battery, the main battery having a positive terminal 220 and a negative terminal 222 disposed for attachment to the vehicle cables. A bus bar 228 maintains electrical communication between a positive termination 226 and a negative termination 224 of respective main battery portions 214 and 212. A bus bar 230 similarly maintains electrical communication between a negative termination 218 of reserve battery 210 and negative termination 222 of the main battery. A switch 236 is disposed to bring positive terminal 220 of the main battery into intermittent electrical communication with a positive terminal 216 of reserve battery 210. The thicker cells comprising main battery portions 212 and 214 permit the use of a greater number of plates per cell than in reserve battery 210 or, alternatively, permit the use of thicker plates.

Figure 12E:
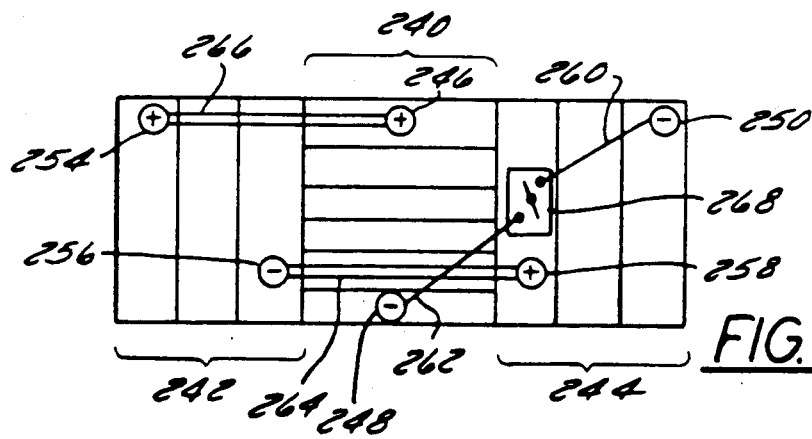

Referring now to FIG. 12E, a reserve battery 240 is illustratively interposed between respective portions 242, 244 of a main battery. A bus bar 266 maintains electrical communication between a positive terminal 254 of the main battery and a positive terminal 246 of the reserve battery. Similarly, a bus bar 264 maintains electrical communication between a positive termination 258 of the main battery and a negative termination 256 of the main battery, such that respective portions 242 and 244 function as a single battery. A switch 268 is disposed to establish intermittent electrical communication between negative reserve battery termination 248 and negative main battery terminal 250 via respective bus bars 262 and 260, respectively. A principal distinction between the dual battery illustrated in FIG. 12E and the dual battery illustrated in FIG. 12D is the relative orientation of the reserve battery with respect to the main battery portions, the main and reserve batteries being substantially coaxial in FIG. 12D whereas the main battery axis is substantially perpendicular to the reserve battery axis in FIG. 12E.

Referring now to FIGS. 2, 3, and 9–11, bottom portion 14 of housing 10, in accordance with one aspect of a preferred embodiment of the present invention, is essentially divided into two separate battery chambers by wall 34. On the left side of wall 34, a plurality of thin, flat, spaced apart partitions 36 define a plurality of main battery cell compartments (cells) 38 therebetween. Respective main battery frustoconical conduits 52, integral with cover 12, are disposed above and extend into a corresponding main battery cell 38 to facilitate the introduction of electrolyte thereinto.

On the right hand side of wall 34, a plurality of reserve battery cell partitions 40 define a series of reserve battery cell compartments 42 therebetween. Respective reserve battery frustoconical conduits 54 (FIG. 11) extend into respective compartments 42 to facilitate the introduction of electrolyte thereinto, which electrolyte may be the same as or different from the electrolyte employed in the main battery inasmuch as the two batteries are isolated by wall 34.

Figure 10:
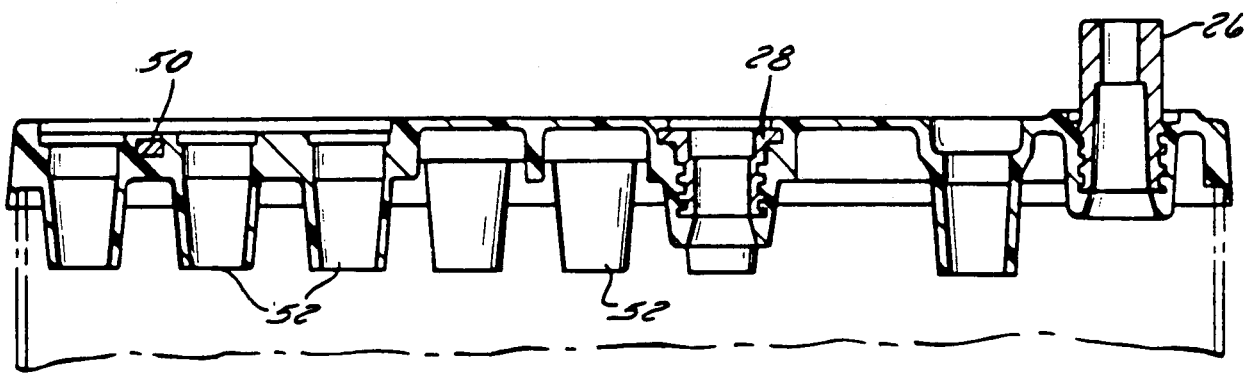
FIG. 10 is a cross-section view of the cover taken along line X—X in FIG. 9, showing a portion of the main battery fill holes, a bus bar, and an external battery terminal.
Figure 11:
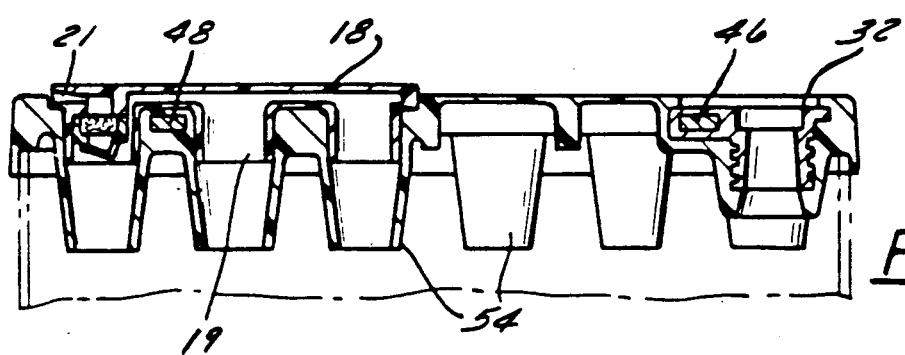
FIG. 11 is a cross-section view of certain of the reserve battery fill holes, including the vent cover and integral vent caps, taken along line XI—XI in FIG. 9.

Respective vent caps 16 and 18 are similar in structure and function. For purposes of illustration, main battery fill holes 52 are shown in FIG. 10 with vent cap 16 removed. FIG. 11 shows reserve battery fill holes 56 with vent cap 18 in place.

Figure 4:
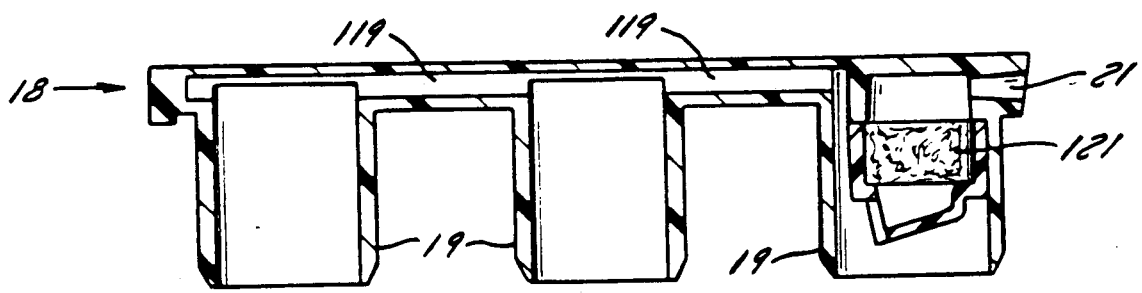
FIG. 4 is an enlarged cross-section view of an exemplary vent cover having integral vent caps.

With reference to FIG. 4, an exemplary embodiment of vent cap 18 suitably comprises a plurality, e.g., three, of integral vent covers 19 extending therefrom. Respective vent covers 19 are configured for disposition within frustoconical projections (fill hole conduits) 54, as shown in FIG. 11. Thus, each of respective projections 19 forms an extension of each conduit 54. Adjacent projections 19 are connected by a common manifold 119 which terminates at aperture 21.

As best seen in FIG. 4, cap 18 is configured to minimize the possibility of electrolyte leakage from a cell to the external environment. At the same time, each cell communicates with the external environment, through conduit 119 and aperture 21, thereby preventing excessive pressure within the battery resulting from, for example, gas generation due to overcharging or self discharging or changes in temperature. In addition, a flame protection device 121 is incorporated into one or more of vent covers 19.

Flame protection device (flame arrestor) 121 suitably comprises a microporous polyethylene disk, advantageously disposed proximate aperture 21. In the embodiment shown in FIG. 4, a single flame arrestor 121 is incorporated into one of the end vents 19 in each cap 18, although a greater number may be employed.

Manifold 119 comprises a continuous pathway extending the length of cap 18. Thus, any flame which may be inadvertently produced by an external source is prevented from entering any of the battery cells, thereby minimizing the risk of explosion. Respective vent caps 16 cooperate with main battery frustoconical fill holes 52 in a similar manner.

Returning now to FIGS. 1–3, a plurality of main battery plates 35 comprise a main battery element 37. One element 37 is disposed within each cell 38 for electrochemical interaction with the main battery electrolyte. The reserve battery plates (not shown) are disposed within each cell 42 in an analogous manner. As explained above, the material composition, number, and size of the reserve battery plates may be the same as or different from the main battery plates, depending on such factors as, for example, main and reserve battery chemistry, the CCA ratio between the main and reserve batteries, and the operating envelope.

In a preferred embodiment, each cell delivers a voltaic potential of approximately two volts. Thus, the main battery and the reserve battery each deliver 12 volts. Although six main battery cells and six reserve battery cells are shown in the illustrated embodiment, those skilled in the art will appreciate that each of the main and reserve batteries may comprise more or less than six cells, depending on, inter alia, the chemistries employed and the desired voltage of each battery.

With continued reference to FIGS. 1–3, housing 10 is suitably made from a resilient, temperature resistant material such as, for example, polyethylene, polyurethane, polystyrene, polypropylene, various copolymers thereof, Noryl, ABS, hard rubber, or various polycarbonates. Strong, light-weight material is highly preferred. In addition, the material should be capable of being heat sealed or vibration welded, or, alternatively, compatible with epoxies or solvents.

With specific reference to FIGS. 9–11, cover portion 12 illustratively comprises an integral unit, having various elements of the battery electronics molded therewithin. Prior to manufacture of cover 12, each termination is joined to a conductive bus bar for carrying current to and from the termination. Specifically, a conductive extension 270 of termination 32 is formed around one end of a first bus bar 46, for example by placing the end of the bus bar in a mold or die and introducing molten or softened lead thereinto. In a similar manner, a conductive extension 274 of termination 26 is formed around one end of a second bus bar 48, and an extension 272 of termination 28 is formed about the opposite end of bus bar 48. One end of a third bus bar 50 is joined to an extension 276 of termination 24, the opposite end of bus bar 50 being disposed within a switch mechanism 100, as discussed in greater detail below. Switch mechanism 100 also receives the end of bus bar 46 remote from termination 32. As best seen FIGS. 10 and 11, negative termination 28 of the main battery and positive termination 32 of the reserve battery need not extend upwardly beyond the upper surface of cover 12.

As best seen FIGS. 10 and 11, bus bars 46, 48 and 50 are suitably rectangular in cross-section and are preferably made from a highly conductive material, for example, copper. In this way, ohmic losses within the battery are minimized, thus providing maximum voltaic potential to the load. Inasmuch as copper is generally incompatable with acidic electrolyte, the bus bars are advantageously isolated from the electrolytic environment, for example by being embedded within cover 12 during manufacture thereof, for example, by an injection molding process.

Referring now to FIGS. 1 and 6–9, switch assembly 100, configured for disposition within a switch cavity 102 in cover 12, suitably comprises a manually operable switching mechanism 60 rotatably mounted within a switch housing 62. Alternatively, manual switch mechanism 60 may be a toggle switch, a push button, or any other convenient mechanism for effecting selective actuation. In an alternate embodiment, the switch mechanism may comprise a remotely actuable mechanism comprising, for example, a solenoid or an SCR.

Figure 6:
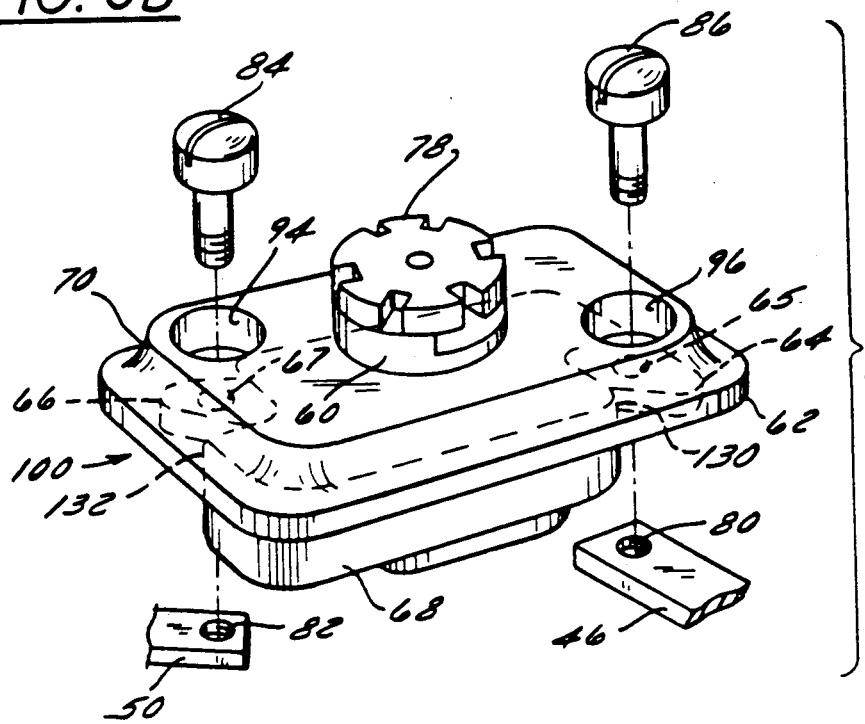
FIG. 6 is a perspective view of the switching mechanism in accordance with the present invention.
Figure 7:
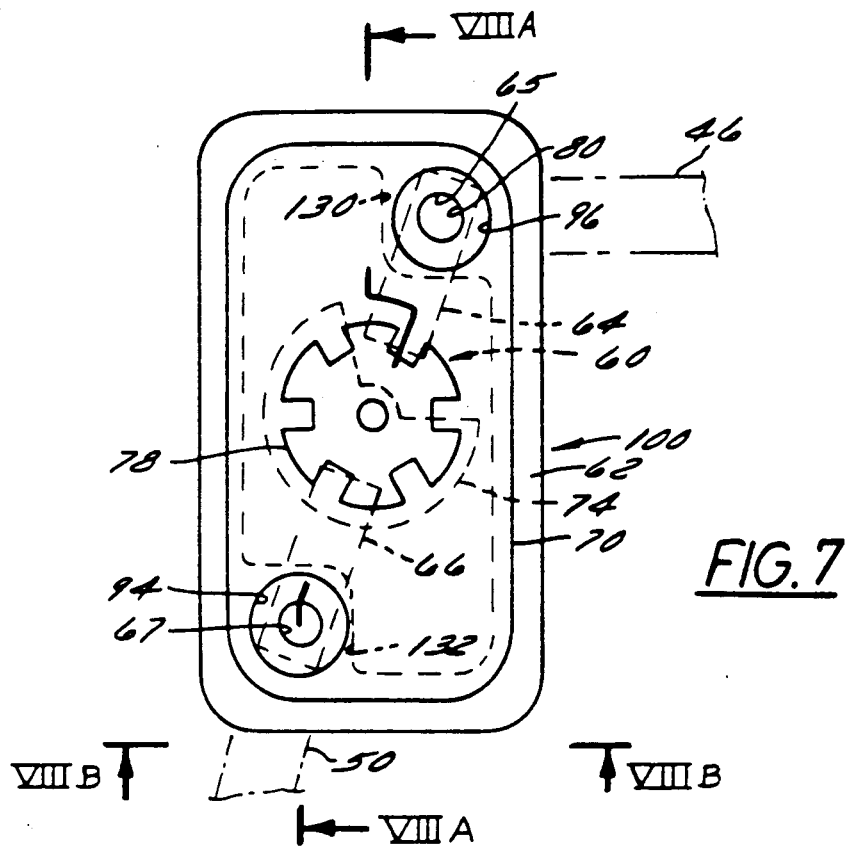
FIG. 7 is a top plan view of the switching mechanism shown in FIG. 6.

Switch housing 62 suitably comprises a seating member 68 joined to a cover portion 70, there being an O-ring 72 disposed about the periphery of housing 62 proximate the junction between seat 68 and cover 70. O-ring 72 protects the switching contacts and the bus bars which they engage (discussed below) from any impurities which might otherwise enter cavity 102. As best seen in FIGS. 6 and 7, top portion 70 is generally rectangular, whereas bottom portion 68 has two diagonally opposed indentations 130, 132 which allow respective ends of bus bars 46 and 50 to be conveniently connected to the switch contacts when switching mechanism 100 is installed within cover 12, as explained below.

Respective first and second switch contacts 64 and 66 are disposed for engagement with respective ends of bus bars 46 and 50, to facilitate selective electrical communication between the main and reserve battery in accordance with the position of mechanism 60.

Figure 8A:
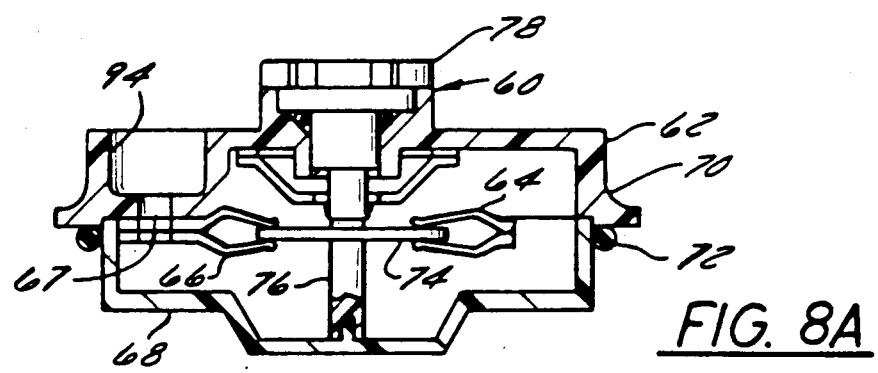
FIG. 8A is a cross-section view of the switching mechanism taken along line VIIIA—VIIIA in FIG. 7.
Figure 8B:
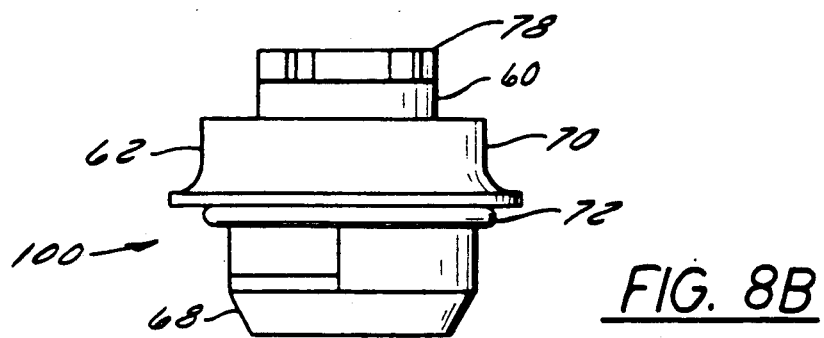
FIG. 8B is an end view of the switching mechanism taken along line VIIIB—VIIIB in FIG. 7.

More particularly, an actuator 78 is disposed at a first end of a rotatable shaft 76, the opposite end of which is mounted to seating member 68 (FIG. 8A). A cam 74 is mounted on shaft 76 for rotation therewith. Cam 74 is configured for slidable engagement with switch contacts 64 and 66, such that cam 74 maintains mechanical and electrical contact with one of the contacts, for example contact 66, throughout the range of rotation of shaft 76. The contour of cam 74 is selected so that it engages contact 64 in the "switched on" position. Mechanical and electrical contact between cam 74 and contact 64 is terminated when manual actuator 78 is rotated to the "switched off" position.

A screw hole 80 (FIG. 6) is disposed near the end of bus bar 46 to facilitate attachment to contact 64 of switch 100. A screw hole 82 is disposed in bus bar 50 for attachment to contact 66 in a similar manner. During assembly, switch housing 62 is inserted into switch cavity 102 in cover 12, respective mating holes 65, 67 in switch contacts 64, 66 being aligned with respective holes 80 and 82 in bus bars 46 and 50. As described above, respective indentations 130, 132 of seat member 68 are removed to facilitate convenient manipulation of contacts 64, 66 into registration with bus bars 46, 50. A screw 84 is thereafter inserted into clearance hole 94 in cover portion 70 of the switch housing; guided through hole 67 in switch contact 66; guided through hole 82 in bus bar 50, and secured in a mounting hole 104 located at the bottom of cavity 102 in cover 12 (FIG. 9). Similarly, a screw 86 is guided through a clearance hole 96 in cover 70; hole 65 in switch contact 64; hole 80 in bus bar 46; and secured in a mounting hole 106 in cover 12. Electrical contact is thereby established between bus bar 46 (and hence the reserve battery) and switch 100, as well as between bus bar 50 (and hence the main battery) and switch 100.

It is generally well known that the stored voltaic potential in electrochemical batteries tends to diminish over time even if the battery terminals comprise an open circuit. Thus, the mere presence of a reserve battery configured for selective actuation provides limited practical utility; the CCA capacity of the battery will deplete, over time, in the absence of either an intermittent or constant, low level, protective charge maintainence system.

Intermittent charging sources which require the operator to periodically monitor and replenish the reserve power capacity are cumbersome and tend to be neglected, thus leaving a reserve battery vulnerable to depletion. In accordance with one aspect of the invention, an electric circuit allows the reserve battery to be charged, at a generally low rate, while the vehicles generator is functioning.

Figure 13:
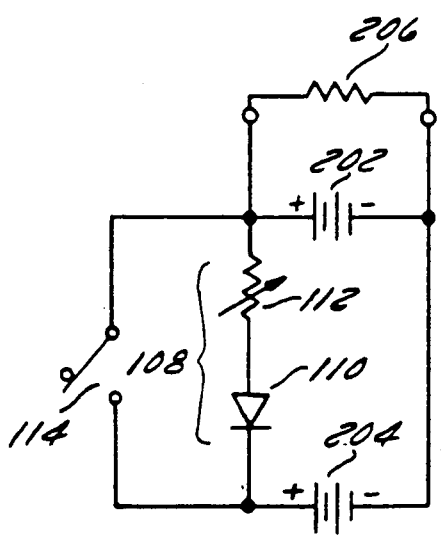
FIG. 13 is a schematic circuit diagram of the system electronics in accordance with one aspect of the present invention, shown in the battery discharge (vehicle starting) condition.

Referring now to FIG. 13, an electric circuit corresponding to the system electronics suitably comprises a reserve battery 204 disposed in parallel with a main battery 202 for delivering power to a load 206, for example the starter mechanism of an automobile. A unidirectional current path 108 suitably comprises a diode 110 and an overcurrent protection device 112, suitably a variable resistor, polyswitch, solid state transistor, thyristor, or any device which selectively limits current through the diode.

In a highly preferred embodiment, variable resistor 112 comprises a model RXE065 PTC positive temperature coefficient (PTC) resistor available from the Raychem Corporation. The resistivity of resistor 112 advantageously changes dramatically as a function of temperature, or more particularly, of power dissipation inasmuch as resistor 112 radiates thermal energy as a function of power passed therethrough. A selectively operable shunt current path 114, analogous to switch 100, is disposed in parallel with unidirectional current path 108.

Circuit 108 functions as a protective charge maintenance circuit by allowing a low level current to pass from the vehicle generator to reserve battery 204. At the same time, circuit 108 prevents current from flowing in the opposite direction, thereby maintaining reserve battery 204 in the charged condition during non-use.

FIG. 13 corresponds to the discharge mode, i.e., when main battery 202 is supplying power to the vehicle. During normal starting conditions in which the voltaic potential of main battery 202 is sufficient to deliver adequate current to load 206, shunt 114 remains open and diode 110 prevents current flow from reserve battery 204 to load 206. Thus, battery 204 is effectively isolated from the circuit during the discharge mode when switch 114 is open. When the voltage in battery 202 becomes drained, for example through excessive cranking cycles or if the vehicle accessories are used when the vehicle generator is not running, shunt 114 may be manually switched to the closed position, thereby bypassing unidirectional current path 108 and allowing the voltaic potential of battery 204 to be applied across load 206. After the vehicle has been started, switch 114 should be closed to prevent inadvertent drain of battery 204 through the shunt path comprising switch 114.

Figure 14:
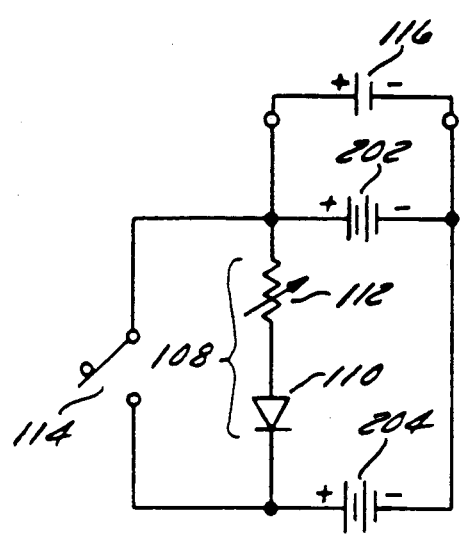
FIG. 14 is a schematic diagram of the circuit FIG. 13, shown in the battery recharge condition.

Referring now to FIG. 14, the circuit diagram of FIG. 13 is shown in the charge mode, corresponding to operation of the vehicle generator. FIG. 14 differs from FIG. 13 in that, rather than load 206 being disposed across the output terminals, a voltage source 116, for example, the generator/alternator system of the vehicle, is disposed thereacross to supply a positive potential to batteries 202 and 204, thereby recharging them, as necessary. In the charge mode, if shunt 114 is closed, batteries 202 and 204 will simultaneously recharge in accordance with their respective voltaic potentials. Inasmuch as the shunt path provides essentially zero electrical resistance, no current flows through unidirectional current path 108.

With continued reference to FIG. 14, when shunt path 114 is open, voltage source 116 causes current to flow downwardly through unidirectional current path 108 to recharge battery 204 (battery 202 will recharge in any event). To protect diode 110, variable resistor 112 is placed in series therewith to limit the amount of current flowing through the diode.

Diodes generate a significant amount of heat as current flows therethrough. In a battery environment, sources of excessive heat are undesirable inasmuch as battery housings and vehicle electrical cables are often made from plastic or rubber. Moreover, the electrolyte may produce volatile gasses under certain conditions, for example, during battery self discharge. Therefore, a mechanism is needed for keeping the temperature of diode 110 within desired limits. Diode 110 and resistor 112 are beneficially selected to maintain thermal radiation at a minimum while supplying sufficient recharge current, for example 0.1-2 amps, to the reserve battery.

Figure 15:
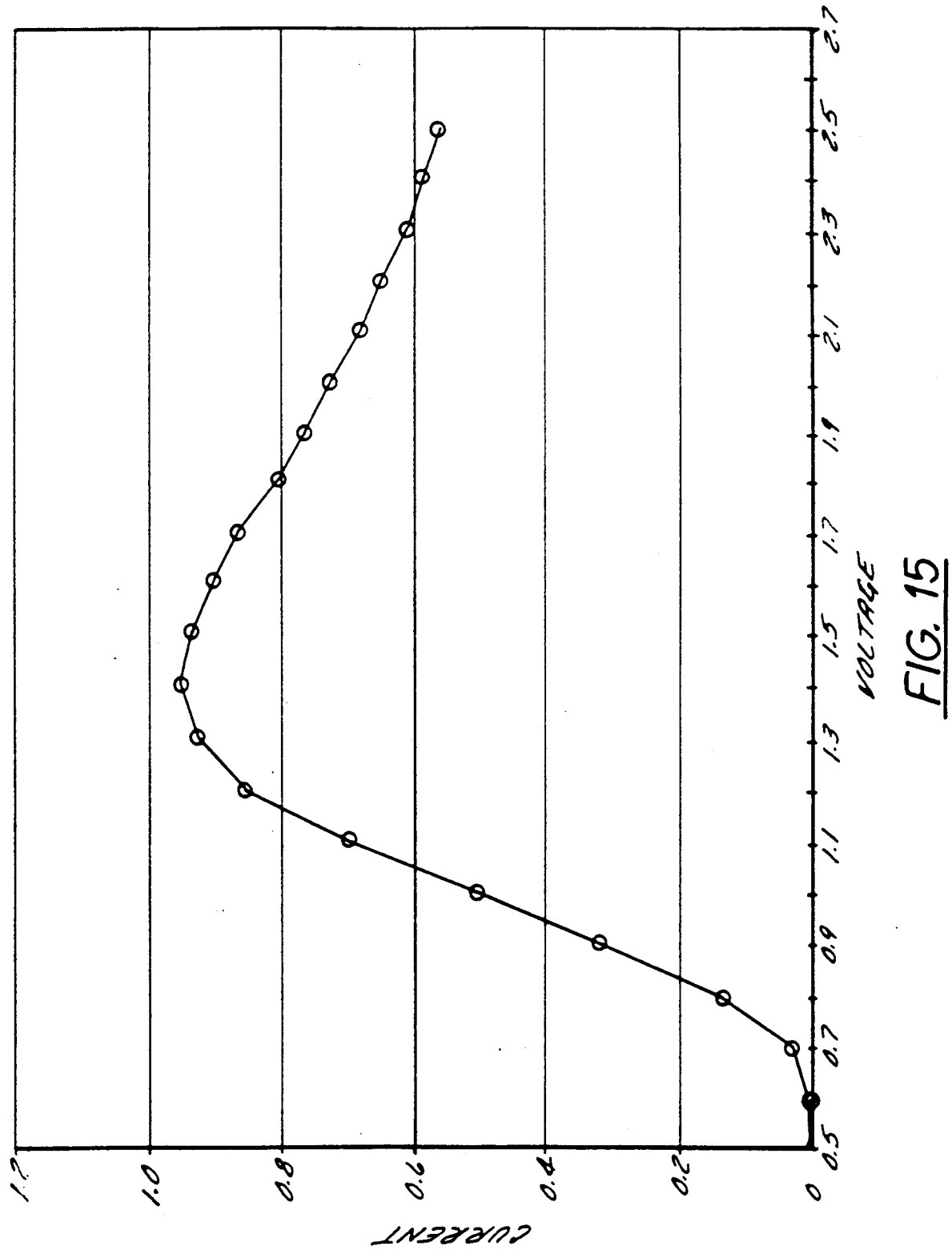
FIG. 15 is a graphical representation of the voltage-current relationship of an exemplary resistor and diode combination.

FIG. 15 illustrates a desired exemplary voltage-current relationship for circuit 108. To the extent vehicle batteries typically undergo extended periods of recharging during vehicle operation, a small amount of current through unidirectional current path 108 is generally sufficient to maintain battery 104 in the charged condition.

More particularly, a voltage differential of about 0.1 to 60 volts, and more particularly about 0.2 to 2.5 volts, is typically maintained across path 108 when switch 114 is open. Resistor 112 is selected to exhibit a resistance on the order of about 0.1 to at least 5 ohms at low voltage levels. This results in current levels in the range of about 0.1 to 25 amperes, particularly about 0.3 to 3 amperes, and most preferably about 1 ampere, through path 108 to recharge battery 104.

As the current flowing through path 108 increases, the resistance exhibited by resistor 112 sharply increases, to approximately 5-10 ohms at current levels in excess of approximately 2 amps. Thus, variable resistor 112 effectively limits the amount of current which travels through, and hence the amount of heat generated by, diode 110.

In accordance with another aspect of the present invention, resistor 112 and diode 110 are sufficiently small to facilitate convenient disposition within cavity 102 in cover 12. Cavity 102 suitably has a width in the range of 1 to 3 inches (2.5 to 7.6 cm) and preferably about 1.2 inches (3.1 cm); a length in the range of about 2 to 3 inches (5.1 to 7.6 cm) and preferably about 2.1 inches (5.3 cm); and a depth (into cover 12) in the range of about 0.2 to 1 inch (0.5 to 2.5 cm), preferably about 0.6 inches (1.4 cm).

An important advantage associated with the subject battery is that existing manufacturing capacity techniques, and equipment presently allocated for conventional batteries may be modified to produce the battery system described herein. A preferred method of manufacturing the dual battery in accordance with various aspects of the invention involves injection molding the cover and container portions of the battery housing, inserting the battery plates into the cells of the container, and thereafter heat sealing or vibration welding the cover portion to the container portion of the housing.

The manufacturing process begins with a mold corresponding to cover portion 12. A conductive linking apparatus is disposed within the mold prior to the injection of plastic thereinto. The conductive linking apparatus suitably comprises bus bars 46, 48, 50, terminations 28, 32, and terminals 24 and 26 (See FIGS. 1 and 9-11). More specifically, termination 32 suitably comprises a lead extension 270 into which an end of bus bar 46 is received. Similarly, termination 28 suitably comprises a lead extension 272 within which a first end of bus bar 48 is received, the second end of bus bar 48 being received within a lead extension 274 integral with terminal 26. A similar lead extension 276, integral with terminal 24, suitably receives one end of bus bar 50.

As best seen in FIG. 9, the region in which respective extensions 270, 272, 274 and 276 are configured about respective ends of bus bars 46, 48, and 50 are advantageously enclosed within respective corrosion resistant plastic sleeves 78. Sleeves 78, suitably made from a chlorinated polyolefin, protect the regions in which the bus bars are received by the lead extensions from inadvertent contact with electrolyte. Furthermore, to the extent the copper bus bars exhibit different thermal expansion characteristics than the cover, container, terminations, terminals, and lead extensions, the bus bars are permitted to slide freely within cover 12.

After the above-described conductive linking apparatus is inserted into the mold, plastic is injected thereinto, thus forming cover 12 with the linking apparatus embedded therein. Container 14 is suitably made by an injection molding process, as is well known in the art.

The molds are desirably water jacketed to facilitate a cooling cycle following the injection of plastic into the mold. After a predetermined cooling time, the cover is removed from the mold and a jumper 110 is inserted into the switching cavity.

Figure 5B:
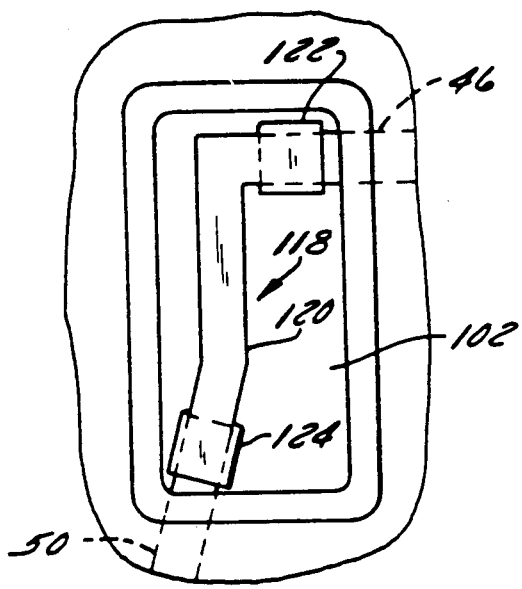
FIG. 5B is a top view of the jumper of FIG. 5A, shown in the switch cavity in the battery cover.
Figure 5A:
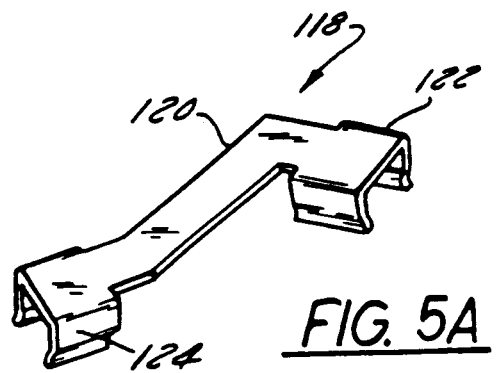
FIG. 5A is a perspective view of an exemplary jumper in accordance with the present invention.

Referring now to FIGS. 5A and 5B, jumper 118 suitably comprises a shaft portion 120 having respective spring clips 122, 124 disposed at respective opposite ends thereof. Jumper 118 is advantageously configured so that, when inserted into cavity 102, clip 122 removably engages bus bar 46 and clip 124 removably engages bus bar 50. Jumper 118 is desirably made from a highly conductive material, thereby facilitating electrical communication between bus bars 46 and 50, and hence, between the main and reserve batteries. Jumper 118 functions as a "dummy" switch during initial charging of the battery system by temporarily maintaining electrical communication between the two batteries. As a result, switch mechanism 100 can be safely, reliably, and efficiently installed into a completed battery without having to withstand the manufacturing process.

After jumper 118 is secured in place, cavity 102 may be covered with protective tape to prevent debris from entering the cavity. In this condition, the cover is ready to be joined to a container, there being a complete electrical circuit within cover 12 by virtue of the contact made between bus bars 46 and 50 via jumper 118.

Prior to joining cover 12 to container 14, the battery elements are inserted into the main and reserve battery cells. For purposes of illustration, two exemplary main battery elements 37 are shown in FIG. 3; however, it will be understood that an element is disposed in each cell of each battery during assembly. Thus, twelve elements are placed into the twelve cells of container 14 (six cells in each of the main and reserve batteries). Each element (see FIG. 3) comprises an alternating series of positive and negative electrodes (plates) 35 having separators (not shown) interposed therebetween. In a preferred embodiment, each element is configured with a positive electrode plate at both ends thereof, such that every element comprises an odd number of total plates (positive and negative electrodes), and further, each element has one more positive plate than negative plates. In a highly preferred embodiment, each element comprises six (6) positive and five (5) negative electrodes, for a total of eleven (11) plates.

All of the positive plates within a particular cell are electrically connected in parallel, forming a current bus, for example by a wire extending from each positive plate. Each negative plate within a particular cell is similarly connected to every other negative plate within the same cell. Thus, two current busses, one positive and one negative, extend from each cell.

The negative current bus of each cell is hard wired to the positive current bus of an adjacent cell, forming a hard wired connection 39. Hard wiring entails establishing a permanent current path between adjacent elements, for example by twisting, soldering, crimping, welding, or fusing the current busses together. In a preferred embodiment, a total of ten (10) hard wired connections are made within container 14 (five hard wired connections within each of the main and reserve batteries.

Interior battery cells, i.e., cells which are not located at an end of the battery, have an adjacent cell on each side thereof. Thus, both the negative and positive current busses extending from interior cell elements are hard wired to an adjacent element. The end cells (terminal cells), on the other hand, only have one adjacent cell. Accordingly, the end cell at one end of each battery includes a free positive current bus, and the end cell at the opposite end of the battery includes a free negative current bus.

The negative and positive current busses associated with the main and reserve batteries are joined with the corresponding negative and positive terminations in cover 12 when the cover is joined to container 14. Depending on the manner in which the current buses are fused to the terminations, fusion may occur prior to, during, or after cover 12 is sealed to container 14. Fusion may be accomplished through resistance heating, friction welding, or, alternatively, through the use of a torch, swage, or crimp, for example. In a preferred embodiment, the current buses are joined to the corresponding terminations after the battery elements are placed within the battery cells. Heat is thereafter applied to terminals 24 and 26, which extend from cover 12, and to terminations 28 and 32, which do not extend through cover 12, through respective access openings (not shown). Respective access hole covers (burn caps) 199 are thereafter sealed to cover 12 to conceal respective terminations 28 and 32.

Cover 12 is united with container 14 such that frustroconical conduits 52 are disposed within compartments (cells) 38 and frustroconical conduits 54 are disposed within compartments (cells) 42. Cover 12 is then sealed to container 14 by any convenient method, for example, heat sealing or vibration welding.

Cover 12 is advantageously sealed to container 14 in the general vicinity of and about a line parallel to circumferential line 13 (see FIG. 1). In addition, the upper edge of wall 34 may be heat sealed or vibration welded to the adjoining undersurface of cover 12 (see, e.g., FIGS. 2 and 3). If desired, the upper edges of partitions 36 and 40 may be sealed to respective portions of cover 14 disposed between adjacent frustoconical conduits 52 and 54, respectively.

Upon sealing of the cover to the container and fusion of the battery elements to the terminations and terminals within the cover, the battery is ready to be filled with aqueous electrolyte. When the same chemistry is employed in the main and reserve batteries, all twelve frustoconical conduits 52, 54 may be simultaneously filled by immersing housing 10 in an aqueous electrolyte bath. If immersion is employed, the protective coating of tape covering cavity 102 (discussed above) for protecting the contents of the cavity from the acidic environment is particularly advantageous. If different chemistries are employed in the respective batteries, one set of frustoconical conduits may be temporarily sealed off while the other is left open, thereby facilitating a two stage submersion process. Alternatively, electroylte may be introduced into respective frustoconical conduits 52, 54 in any convenient manner, for example by inserting a tube into the conduits.

Upon filling the battery with electrolyte, respective vent caps 16, 18 are secured to cover 12. At this stage, the battery resembles a conventional battery, having, for example, two external terminals. Moreover, jumper 118 is disposed such that the dual battery functions as a single battery from an electrical standpoint. Accordingly, the battery may be formed in accordance with conventional formation techniques.

Formation is the process by which a battery is initially charged. Cables (not shown) are attached to terminals 24, 26 by any convenient method, for example, by twist-on connectors. The cables supply direct DC current to the battery terminals, advantageously from a rectifier used to convert a conventional AC power source to a DC current source.

Upon formation of the battery, jumper 118 is removed, thereby isolating the reserve battery from the main battery. Switching mechanism 100 is thereafter inserted into battery cavity 102, electrically and mechanically connecting respective switch contacts 64, 66 to respective bus bars 46 and 50 through the use of respective conductive screws 84 and 86. During installation of the switch, manual actuator 78 should be in the "switched off" (open) position such that the reserve battery remains isolated from the circuit comprising the main battery and terminals 24 and 26. The battery will function as a single battery, employing power delivered from the main battery only, until manual actuator 78 is switched to the closed position, thereby bringing the reserve battery into parallel with the main battery.

A primary advantage of the present invention resides in the capability of the main battery to produce in the range of about 400 to 600 cold crank amps (CCA), and particularly approximately 525 CCA's, while leaving sufficient room within a conventional battery housing envelope for an auxiliary (reserve) battery, capable of producing between 200 and 400 CCA's, and particularly approximately 275 CCA's. As is known in the industry, the above-recited CCA values are predicated upon worst case design conditions typically associated with starting an automobile at 0° F. The above recited CCA values generally correspond to a 7.2 volt baseline potential, which is the design minimum at the above-recited temperature.

The ability to dispose both batteries within a conventional housing envelope is largely a function of the relative orientation of the two batteries. The perpendicular disposition of the reserve battery relative to the main battery, n accordance with a preferred embodiment, reflects enhanced efficiency in terms of the desired voltage ratio (between the main and reserve battery) obtainable within the operating envelope.

It will be understood that the above description is of preferred exemplary embodiments of the present invention, and that the invention is not limited to the specific forms shown. Various other substitutions, modifications, changes, and omissions may be made in the design and arrangement of the elements without departing from the spirit of the invention as expressed in the appended claims.

I claim:

1. An automobile battery system comprising:
  a container having a first compartment and a second compartment;
  a main battery disposed in said first compartment;
  an auxiliary battery disposed in said second compartment;
  a cover configured to enclose said container;
  a positive and a negative battery terminal mounted in said cover;
  positive circuit means for connecting said main and said auxiliary battery to said positive terminal;
  negative circuit means for connecting said main and auxiliary batteries to said negative terminals, comprising;
    switch means for selectively connecting and disconnecting said auxiliary battery to said negative terminal; and
    charge circuit means, bypassing said switch means, for charging said auxiliary battery simultaneously with said main battery.

2. The system according to claim 1, wherein said charge circuit means includes means for limiting the direction of current flow therethrough.

3. The system according to claim 2 including means for limiting the amount of current flow through said charge circuit means.

4. The system according to claim 1, wherein said circuit means are embedded in said cover.

5. The system of claim 2 wherein said direction limiting means comprises a diode for facilitating current flow from at least one of said battery terminals to said auxiliary battery and for inhibiting current flow in the opposite direction.

6. The system of claim 5, wherein:
  said switch means comprises first and second contacts and a select means for selectively establishing electrical communication between said first and second contacts;
  said amount limiting means comprises a resistor connected in series with said diode, the resistance of said resistor being an increasing function of current flow therethrough.

7. The system of claim 6, wherein the voltage differential across said diode is about 0.7 volts, and said resistor exhibits a variable resistance such that the current level in said diode ranges from about 0.1 to 25 amperes when said charge circuit means is configured to charge said auxiliary battery.

8. The system of claim 6, wherein said resistor comprises a positive temperature coefficient resistor exhibiting resistances of sufficient magnitude to maintain the current running through said diode within the range of up to about 2 amps.

9. A dual battery, comprising:
  a housing having first and second terminals extending therefrom, said terminals configured for attachment to conventional vehicle battery cable systems;
  first and second batteries disposed within said housing;
  means for maintaining electrical communication between said first and second batteries and said first and second terminals;
  switch means for selectively conducting current from said second battery to one of said first and second terminals when said switch means is on, said switch means configured to inhibit current flow from said second battery to said terminals when said switch means is off;
  charge means for permitting current flow from at least one of said terminals to said second battery when said switch means is off;
  wherein said charge means comprises a diode having a resistor in series therewith, said resistor exhibiting a resistance which varies as a function of power dissipated thereby such that the level of current flowing through said diode is in the range of about 0.3 to 3 amps.

10. A dual battery, comprising:
  a container;
  a main battery disposed in the container comprising a series of main battery elements;
  a reserve battery disposed in the container comprising a series of reserve battery elements;
  a main pair of positive and negative terminations disposed near opposite ends of the series of main battery elements;
  a reserve pair of positive and negative terminations disposed near opposite ends of the series of reserve battery elements;
  electrical connectors connecting the negative terminations of the main and reserve batteries and the positive terminations of the main and reserve batteries, one of said electrical connectors including a changing circuit which comprise a diode and a resistor connected in series with the diode for limiting the amount of current which flows through the diode and further comprising a switch for selectively interrupting one of the electrical connectors, said switch being connected in parallel with said charging circuit.

11. A dual battery, comprising:

an elongated container having a bottom wall, a plurality of side walls, an open upper end, a first series of spaced internal cell walls for defining a series of main cell compartments, a second series of internal cell walls for defining a series of reverse cell compartments, and a partition wall for isolating the main cell compartments from the reserve cell compartments;

a cover which fits over and is secured to the open upper end of the container;

a series of main battery elements each comprising a plurality of battery plates disposed in each of the main cell compartments;

first intercell electrical connectors for joining each of the main battery elements in series;

a series of reserve battery elements each comprising a plurality of battery plates disposed in each of the reserve cell compartments;

second intercell electrical connectors for joining each of the reserve battery elements in series;

a main pair of positive and negative terminations disposed near opposite ends of the series of main cell compartments;

a reserve pair of positive and negative terminations disposed near opposite ends of the series of reserve call compartments;

electrical connectors connecting the negative terminations of the main and reserve batteries and the positive terminations of the main and reserve batteries; and a switch for selectively interrupting one of the electrical connectors.

12. The battery of claim 11, wherein the partition wall forms a series of T-shaped junctures with at least some of the internal cell walls.

13. The battery of claim 11, wherein some or all of the reserve battery cells and battery elements are substantially perpendicular to the main battery cells and battery elements.

14. The battery of claim 12, wherein the partition wall and internal cell walls are integrally molded with the container.

15. The battery of claim 11 further comprising a charge circuit for charging the reserve battery cells at the same time as the main battery cells are changed when the switch is open, including a device for limiting the amount of current which can flow through the charge circuit, the charge circuit bypassing the switch.

16. The battery of claim 15, wherein the charge circuit comprises a diode and a variable resistor connected in series, the resistance of the variable resistor increasing in response to increased current flow through the charge circuit.

17. The battery of claim 11, wherein the container and cover are made of plastic, and the electrical connectors include bus bars embedded within the cover.

18. The battery of claim 11, wherein the positive termination of the main battery and the negative termination of the reserve battery protrude from the cover near respective corners thereof for connection with automotive battery cables, and the negative termination of the main battery and the positive termination of the reserve battery are disposed in recessed positions within the cover.

19. The battery of claim 11, wherein the cover has an upwardly-opening cavity in which the switch is removably mounted, the electrical connections include a pair of bus bars which extend from their respective terminations to the cavity in the cover and are exposed therein, and the switch includes a housing which fits within the cavity, a manually operable actuator, and electrical contacts for conducting current from one bus bar to the outer when the switch is in a closed position.

20. The battery of claim 11, wherein the main and reserve batteries are lead-acid batteries.

21. The battery of claim 20, wherein the cover is provided will spaced fill holes for filling each cell with a liquid acid electrolyte, and with vented caps for closing each hole while permitting venting of gases generated during battery operation within the main and reverse cells, each vent can having a flame arrestor therein through which gases must pass to exit the vent cap through an aperture therein.

22. The battery of claim 11, wherein the plates of the reserve cells have a lesser surface area than the plates of the main cells.

23. The battery of claim 11, wherein said series of main cell compartments is divided into two portions disposed on opposite sides of said series of reserve cell compartments, and said battery further comprises an additional partition wall for isolating both portions of the main cell compartments from the reserve cell compartments.

24. The battery of claim 23, wherein one of said first intercell connectors comprises a bus bar extending over said reserve cell compartments and connected to respective positive and negative terminations of two main battery elements on opposite sides of and adjacent to the reserve cell compartments.

25. The battery of claim 23, wherein said main cell compartments are disposed parallel to said reserve cell compartments.

26. The battery of claim 23, wherein said main cell compartments are disposed perpendicular to said reserve cell compartments.

27. The battery of claim 23, wherein the main cell compartments are wider than the reserve cell compartments and contain more battery plates than the reserve cell compartments.

28. The battery of claim 23, wherein the main cell compartments are wider than the reserve cell compartments and contain thicker battery plates than the reserve cell compartments.

* * * * *

UNITED STATES PATENT AND TRADEMARK OFFICE
CERTIFICATE OF CORRECTION

PATENT NO. : 5,002,840

DATED : March 26, 1991

INVENTOR(S) : Alan J. Klebenow, Thomas J. Dougherty, Edward N. Mrotek, David A. Thuerk and Maurice G. Michaud It is certified that error appears in the above-identified patent and that said Letters Patent is hereby corrected as shown below:

Column 20, line 20, delete "outer" and insert --other--;
line 24, delete "will" and insert --with--;
line 28, delete "can" and insert --cap--.

Signed and Sealed this

Third Day of November, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 5,002,840

DATED : March 26, 1991

INVENTOR(S) : Klebenow et al.

It is certified that error appears in the above-identified patent and that said Letters Patent is hereby corrected as shown below:

In the abstract, line 7, correct the spelling of "disposed".
In the drawing, sheet 5, Figure 9, four occurrences, change "78" to --79--. Column 1, line 8, correct spelling of "intermittent". Column 2, line 27, correct spelling of "accommodate". Column 6, line 5, corrct spelling of "susceptibility". Column 6, line 33, after "such" insert --that--. Column 7, line 10, change "covers" to --caps--. Column 7, line 57, change "28" to --24--. Column 7, line 66, change "battery" to --housing--. Column 7, line 67, change "battery" to --housing--. Column 9, line 8, change "termination" to --terminal--. Column 9, line 67, change "projections" to --vent covers--. Column 10, line 1, change "projections" to --vent covers--. Column 10, line 17, change "vents" to --vent covers--. Column 10, line 66, change "termination" to --terminal--. Column 11, lines 15-16, correct spelling of "incompatible". Column 11, line 38, change "top" to --cover--. Column 11, line 39, change "bottom portion" to --seat--. Column 12, lines 25-26, correct spelling of "maintenance". Column 13, line 3, change "switch" to --shunt--. Column 13, line 11, change "switch" to --shunt--. Column 13, line 13, change "switch" to --shunt--. Column 13, line 53, change "104" to --204--. Column 13, line 57, change "switch" to --shunt--. Column 13, line 63, change "104" to --204--. Column 14, line 43, both occurrences, change "78" to --79--. Column 14, line 59, change "110" to --118--. Column 16, line 25, change "14" to --12--. Column 16, line 41, correct spelling of "electrolyte". Column 17, line 25, change "battery, n" to --battery, in--. Claim 5, column 17, line 66, change "2" to --3--. Claim 10, column 18, line 64, change "changing" to --charging--. Claim 11, column 19, line 10, change "reverse" to --reserve--. Claim 11, column 19, line 31, change "call" to --cell--. Claim 15, column 19, line 50, change "changed" to --charged--.

UNITED STATES PATENT AND TRADEMARK OFFICE
CERTIFICATE OF CORRECTION

PATENT NO. : 5,002,840
DATED : March 26, 1991
INVENTOR(S) : Klebenow et al

It is certified that error appears in the above-indentified patent and that said Letters Patent is hereby corrected as shown below:

Claim 21, column 20, lines 27-28, change "reverse" to --reserve--.
Claim 21, column 20, line 28, change "can" to --cap--.

Signed and Sealed this

Twenty-ninth Day of June, 1993

Attest:

MICHAEL K. KIRK

Attesting Officer

Acting Commissioner of Patents and Trademarks